Patented Aug. 10, 1948

2,446,804

UNITED STATES PATENT OFFICE 2,446,804

3-ARYL-3-CARBALKOXY PIPERIDINES AND PYRROLIDINES AND SYNTHESIS THEREOF

Franz Bergel, Alexander Lang Morrison, and Heinrich Rinderknecht, Welwyn Garden City, England, assignors, by mesne assignments, to Hoffmann-La Roche Inc., Roche Park, Nutley, N. J., a corporation of New Jersey No Drawing. Application February 25, 1944, Serial No. 523,908. In Great Britain March 9, 1943

6 Claims. (Cl. 260—294)

In British Patent Specification No. 552,065 a process for the preparation of heterocyclic bases is described which comprises condensing an arylacetonitrile derivative with a tertiary halogen alkyl-benzylamine in the presence of an alkaline condensing agent and subjecting the condensation product to catalytic hydrogenation whereby tertiary heterocyclic bases are formed.

The present invention relates to the preparation of secondary and tertiary heterocyclic bases. According to the invention, arylacetonitrile derivatives of the general formula

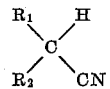

where $R_1$ is an aryl which may carry substituents not interfering with the reaction and $R_2$ is an alkyl, an aryl or an esterified carboxyl group, are condensed in the form of their alkali metal salts, e. g. their sodium salts with 1,2- or 1,3-dihalogenoparaffins in alcoholic solution. The condensation products have the general formula

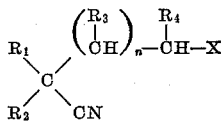

where $n$ is 1 or 2, $R_3$ and $R_4$ are H or alkyl groups and X is a halogen.

On reaction with alkylbenzylamine or dibenzylamine these compounds are transformed into the corresponding tertiary bases of the general formula

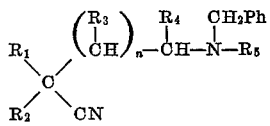

where $R_5$ is a benzyl or an alkyl radical. Catalytic hydrogenation of these bases, in the course of which intramolecular condensation takes place with elimination of ammonia and toluene, yields cyclic bases of the general formula

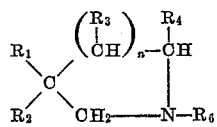

where $R_6$ is H or an alkyl group.

The new compounds are in part valuable therepeutics. The following examples illustrate how the invention may be carried into effect.

Example 1

To a mixture of 7.6 parts by weight of ethyl phenyl-cyanoacetate and an alcoholic solution of sodium ethylate, prepared by dissolving 0.46 part by weight of sodium in 20 parts by volume of absolute alcohol, 6.3 parts by weight of 1,3-chlorobromo-propane are added. The reaction mixture is heated in a sealed vessel to 130° C. for 5 hours. After cooling it is filtered. The filtrate is freed from solvent by heating on the water bath under reduced pressure. The residue is taken up in ether. The ether extract is washed three times with water and evaporated. The residue is distilled when the ethyl ester of α-phenyl-α-cyano-δ-chloro-valeric acid comes over at 128°–129° C./0.1 mm. as a colourless oil. A mixture of 3.0 parts by weight of this compound and 4.5 parts by weight of dibenzylamine are heated in a sealed vessel to 110°–120° C. for 7 hours. The crystalline reaction mass is then triturated thoroughly with a mixture of ether and dilute hydrochloric acid and centrifuged. The precipitate which is a mixture of the hydrochlorides of dibenzylamine and α-phenyl α - cyano - δ - dibenzylamino-valeric acid ethyl ester is suspended in dilute caustic soda solution. The free bases are now extracted with ether and after evaporation of the extract, subjected to fractional distillation under reduced pressure. The α-phenyl-α-cyano-δ-dibenzylamino-valeric acid ethyl ester comes over at 215–217° C./0.1 mm. as a yellow viscous oil.

2.5 parts by weight of this amine are hydrogenated in alcoholic solution, using a palladium charcoal catalyst, prepared from 3 parts by weight of activated charcoal and 5 parts by volume of 10% palladium chloride solution. When the absorption of hydrogen has ceased, the reaction mixture is filtered and the solvent evaporated. The residue is taken up in dilute hydrochloric acid and is washed with ether. The aqueous part is then rendered alkaline by adding strong caustic soda with external cooling and is extracted with ether. After removal of the ether the remaining oil is distilled. The 3-phenyl-3-carbethoxy-piperidine comes over at 106–107° C./0.1 mm. as a colourless oil. It forms a solid nitroso derivative which melts at 88–90° C. The hydrochloride is easily soluble in water and has medical value as a powerful analgesic.

Example 2

To a mixture of 7.6 parts by weight of ethylphenyl-cyano-acetate in an alcoholic solution of sodium ethylate, prepared by dissolving 0.46 part by weight of sodium in 15 parts by volume of absolute alcohol, 7.6 parts by weight of ethylene dibromide are added. The mixture is gradually heated in a sealed vessel to 115° C. for 3 hours. After cooling, it is filtered and the solvent evaporated. The residue is taken up in benzene. The benzene solution is washed with water and evaporated on the water bath. The residue, a yellow oil, is condensed without further purification, with 6.1 parts by weight of methyl-benzylamine in 10 parts by volume of alcohol by heating in a sealed vessel to 100° C. for 3 hours. The resulting α-phenyl-α-cyano-δ-methyl - benzylamino - butyric acid ethyl ester is isolated from the reaction mixture in a manner similar to that described in the previous example. It distils at 176–178° C./0.12 mm. and is a yellowish viscous oil. Catalytic hydrogenation, proceeding as described in Example 1, yields N-methyl-3-phenyl-3-carbethoxy-pyrrolidine which boils at 97–100° C./0.1 mm. and is a colourless mobile liquid. It forms a picrate of melting point 116–118° C.

*Example 3*

89.7 parts by weight of ethyl-α-phenyl-α-cyano-δ-chloro-valerate (prepared as described in Example 1) are dissolved in 650 parts by volume of acetone, 53.3 parts by weight of sodium iodide and 82 parts by weight of methylbenzylamine are then added and the mixture is refluxed for 20 hours. After filtration, the acetone is evaporated and the residue taken up in ether. The extract is filtered and washed with ice cold aqueous sodium hydroxide solution and water. It is then dried over anhydrous sodium sulphate and evaporated. The residue, ethyl-α-phenyl-α-cyano-δ-methyl-benzyl-amino-valerate, distils at 195–197° C./0.5 mm. and is a thick yellow oil.

7 parts by weight of this amine are hydrogenated in alcoholic solution using palladized charcoal as catalyst, prepared from 6 parts by weight of activated charcoal and 20 parts by volume of a 5% aqueous solution of a palladium chloride when the hydrogen absorption has become slow, another portion of 5 parts by volume of palladium chloride solution is added and shaking continued until the absorption of hydrogen has ceased. The mixture is then worked up as described in Example 1. The ethyl-1-methyl-3-phenyl-piperidine-3-carboxylate distils at 104° C./0.2 mm. and is a colourless mobile oil. It forms a crystalline hydrochloride of M. P. 177–180° C. and a hydroiodide of M. P. 207° C. These salts possess pronounced analgesic activity.

We claim:

1. A process for the preparation of heterocyclic bases of the general formula:

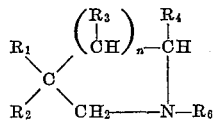

wherein $R_1$ is an aryl group, $R_2$ represents carbalkoxy, $R_3$, $R_4$ and $R_6$ are selected from the group consisting of a hydrogen atom and alkyl groups, and $n$ is an integer selected from the group consisting of one and two, which comprises condensing arylacetonitrile derivatives of the general formula:

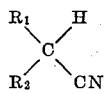

in the form of their alkali metal salts with dihalogenoparaffins selected from the group consisting of 1.2-dihalogenoparaffins and 1.3-dihalogenoparaffins in alcoholic solution to form condensation products of the general formula:

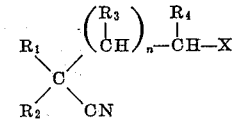

where X is a halogen, reacting the condensation products thus produced with benzylamines selected from the group consisting of alkylbenzylamines and dibenzylamine to form tertiary bases of the general formula:

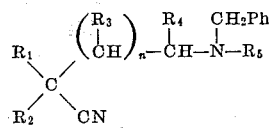

where $R_5$ is a radical selected from the group consisting of benzyl and alkyl radicals and catalytically hydrogenating the said bases to form heterocyclic bases of the general formula:

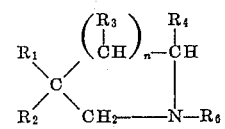

2. A process for the preparation of heterocyclic bases of the general formula:

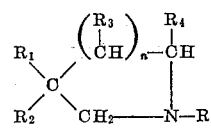

wherein $R_1$ is an aryl group, $R_2$ represents carbalkoxy, $R_3$, $R_4$ and $R_6$ are selected from the group consisting of a hydrogen atom and alkyl groups, and $n$ is an integer selected from the group consisting of one and two, which comprises condensing arylacetonitrile derivatives of the general formula:

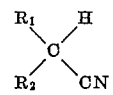

in the form of their sodium salts with dihalogenoparaffins selected from the group consisting of 1.2-dihalogenoparaffins and 1.3-dihalogenoparaffins in alcoholic solution to form condensation products of the general formula:

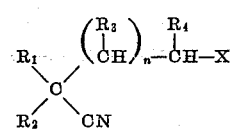

where X is a halogen, reacting the condensation products thus produced with benzylamines selected from the group consisting of alkylbenzylamines and dibenzylamine to form tertiary bases of the general formula:

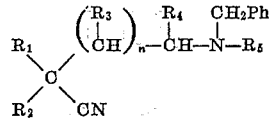

where $R_5$ is a radical selected from the group consisting of benzyl and alkyl radicals and catalytically hydrogenating the said bases to form heterocyclic bases of the general formula:

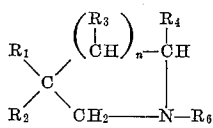

3. A process for the preparation of 3-phenyl-3-carbethoxy-piperidine which comprises condensing ethyl phenyl cyanoacetate in the form of its sodium salt with 1.3-chloro-bromo-propane in alcoholic solution to form α-phenyl-α-cyano-δ-chloro-valeric acid, heating this compound with dibenzylamine to form α-phenyl-α-cyano-δ-dibenzylamino-valeric acid ethyl ester and hydrogenating this compound in the presence of a palladium catalyst to form 3-phenyl-3-carbethoxy-piperidine.

4. A process for the preparation of N-methyl-3-phenyl-3-carbethoxy-pyrrolidine which comprises condensing ethyl phenyl cyanoacetate in the form of its sodium salt with ethylene dibromide in alcoholic solution, heating the condensation product with methyl benzylamine to form α-phenyl-α-cyano-δ-methyl-benzylamino-butyric acid ethyl ester and hydrogenating this compound in the presence of a palladium catalyst to form N-methyl-3-phenyl-3-carbethoxy-pyrrolidine.

5. As a new compound 3-phenyl-3-carbethoxy-piperidine.

6. Compounds of the general formula:

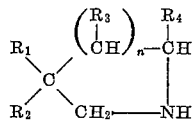

where $R_1$ is an aryl group, $R_2$ is carbalkoxy, and $R_3$ and $R_4$ represent each a member selected from the group consisting of a hydrogen atom and alkyl groups, and $n$ is an integer selected from the group consisting of one and two.

FRANZ BERGEL.
ALEXANDER LANG MORRISON.
HEINRICH RINDERKNECHT.

REFERENCES CITED

The following references are of record in the file of this patent:

UNITED STATES PATENTS

| Number | Name | Date |
|---|---|---|
| 2,167,351 | Eisleb | July 25, 1939 |
| 2,405,555 | Bergel et al. | Aug. 13, 1946 |

FOREIGN PATENTS

| Number | Country | Date |
|---|---|---|
| 552,065 | Great Britain | Mar. 22, 1943 |
| 563,665 | Great Britain | Aug. 24, 1944 |

OTHER REFERENCES

Fischer: "Die Chemie des Pyrrols," 1934, vol. 1, page 326.

J. Amer. Chem. Soc., December, 1936, page 2487.